United States Patent
Noll et al.

(10) Patent No.: US 12,484,474 B2
(45) Date of Patent: Dec. 2, 2025

(54) BREAKAWAY RIGID HEADER HEIGHT CONTROL SYSTEM

(71) Applicant: CNH Industrial America LLC, New Holland, PA (US)

(72) Inventors: Blaine Robert Noll, Fleetwood, PA (US); Joel Timothy Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 517 days.

(21) Appl. No.: 18/094,575

(22) Filed: Jan. 9, 2023

(65) Prior Publication Data
US 2024/0224850 A1 Jul. 11, 2024

(51) Int. Cl.
*A01D 34/24* (2006.01)
*A01D 34/04* (2006.01)
*A01D 41/14* (2006.01)

(52) U.S. Cl.
CPC ........... *A01D 34/243* (2013.01); *A01D 34/04* (2013.01)

(58) Field of Classification Search
CPC ..... A01B 63/002; A01B 63/008; A01B 63/02; A01B 63/108; A01B 63/118; A01B 63/24; A01B 63/32; A01D 34/04; A01D 34/24; A01D 34/246; A01D 34/28; A01D 34/283; A01D 34/286; A01D 34/243; A01D 41/145; A01D 41/141
See application file for complete search history.

(56) References Cited

U.S. PATENT DOCUMENTS

| | | | | |
|---|---|---|---|---|
| 3,611,286 A | * | 10/1971 | Cleveland | A01B 69/024 340/684 |
| 3,611,686 A | * | 10/1971 | Van Antwerp | A01D 41/141 56/208 |
| 3,906,710 A | * | 9/1975 | Pask | A01D 57/00 56/DIG. 15 |
| 4,009,555 A | | 3/1977 | Temple | |
| 4,166,349 A | | 9/1979 | Coenenberg et al. | |
| 5,713,190 A | * | 2/1998 | Vermeulen | A01D 41/141 56/DIG. 15 |

(Continued)

FOREIGN PATENT DOCUMENTS

| | | |
|---|---|---|
| DE | 102015122235 | 6/2017 |
| DE | 102016002123 | 8/2017 |

(Continued)

*Primary Examiner* — Adam J Behrens
(74) *Attorney, Agent, or Firm* — Fletcher Yoder, P.C.

(57) ABSTRACT

A rigid height control system configured to be coupled to a header includes a rigid arm pivotally coupled to a shaft. The rigid arm includes an upper end and a lower end, wherein the lower end is configured to engage a ground surface. The rigid height control system includes a metal channel guide coupled to the shaft and a magnet embedded within the rigid arm adjacent the upper end. The magnet is configured to keep the rigid arm attached to the metal channel guide via a magnetic force so that the lower end engages the ground surface when the agricultural harvester travels in a forward direction. The magnet is configured, when the agricultural harvester travels in a reverse direction causing a force exerted by the ground surface on the rigid arm to exceed the magnetic force, to allow a release of the rigid arm from the metal channel guide.

20 Claims, 5 Drawing Sheets

(56) References Cited

U.S. PATENT DOCUMENTS

| | | | |
|---|---|---|---|
| 6,202,395 B1 * | 3/2001 | Gramm | A01D 41/141 |
| 6,758,029 B2 * | 7/2004 | Beaujot | A01D 41/141 |
| | | | 56/10.2 E |
| 6,883,299 B1 * | 4/2005 | Gramm | A01D 41/14 |
| | | | 172/4 |
| 7,222,474 B2 * | 5/2007 | Rayfield | A01D 41/141 |
| | | | 56/10.2 E |
| 7,647,753 B2 * | 1/2010 | Schlipf | A01D 41/141 |
| | | | 56/10.2 E |
| 7,975,458 B1 * | 7/2011 | Noll | A01D 41/141 |
| | | | 56/10.2 E |
| 8,146,335 B2 * | 4/2012 | Vandeven | A01D 41/141 |
| | | | 56/10.2 E |
| 8,201,388 B1 * | 6/2012 | Vandeven | A01D 41/141 |
| | | | 56/10.2 E |
| 10,306,829 B2 * | 6/2019 | Fay, II | A01D 47/00 |
| 10,349,578 B2 * | 7/2019 | Cook | A01D 41/141 |
| 10,477,764 B2 * | 11/2019 | Lacy | A01D 41/145 |
| 10,736,265 B2 * | 8/2020 | Fuchtling | A01D 34/04 |
| 11,382,267 B2 * | 7/2022 | Kong | A01D 34/283 |
| 2002/0069628 A1 * | 6/2002 | Metzger | A01D 41/141 |
| | | | 56/208 |
| 2006/0242935 A1 * | 11/2006 | Rayfield | A01D 41/141 |
| | | | 56/10.2 E |
| 2010/0077712 A1 * | 4/2010 | Nathan | A01D 41/141 |
| | | | 56/208 |
| 2015/0107209 A1 * | 4/2015 | Pierson | A01D 41/141 |
| | | | 56/10.2 E |
| 2018/0228080 A1 * | 8/2018 | Fay, II | A01D 34/243 |
| 2018/0228086 A1 * | 8/2018 | Cook | A01D 34/243 |

FOREIGN PATENT DOCUMENTS

| | | | | |
|---|---|---|---|---|
| EP | 3711472 A1 * | 9/2020 | | A01D 41/141 |
| GB | 1481083 | 7/1977 | | |
| WO | 2019076707 | 4/2019 | | |

* cited by examiner

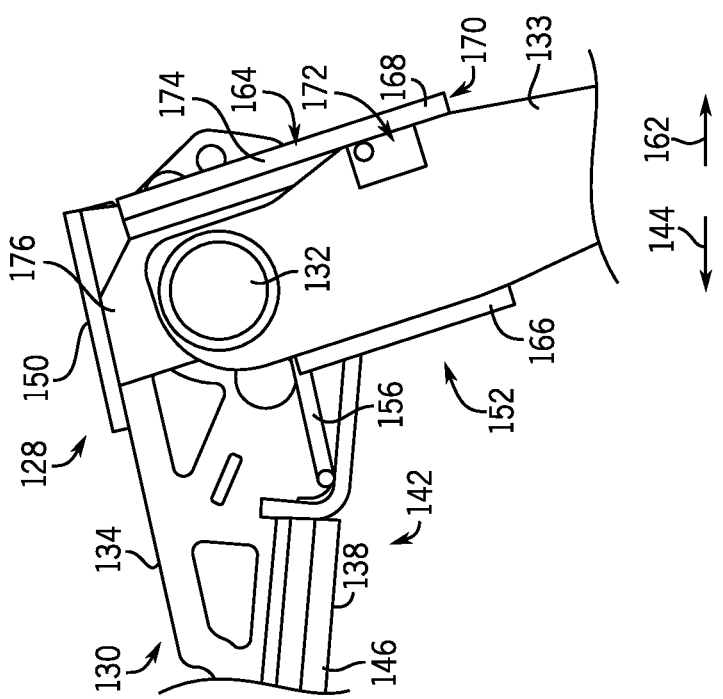
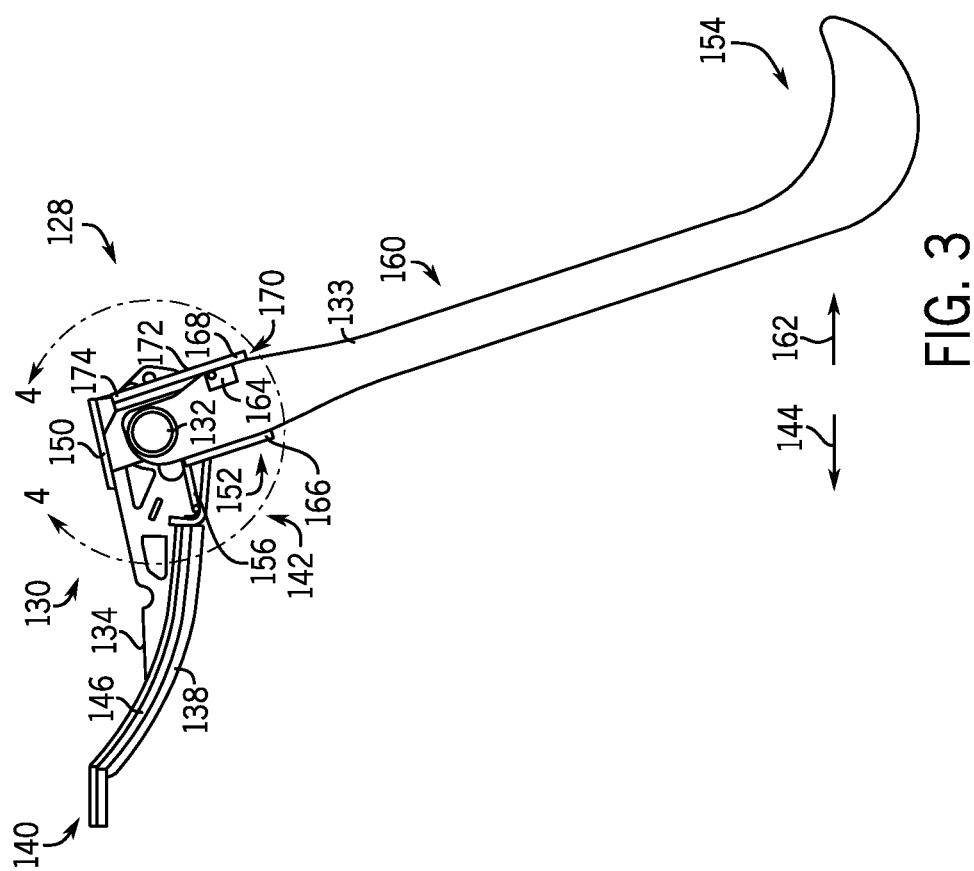

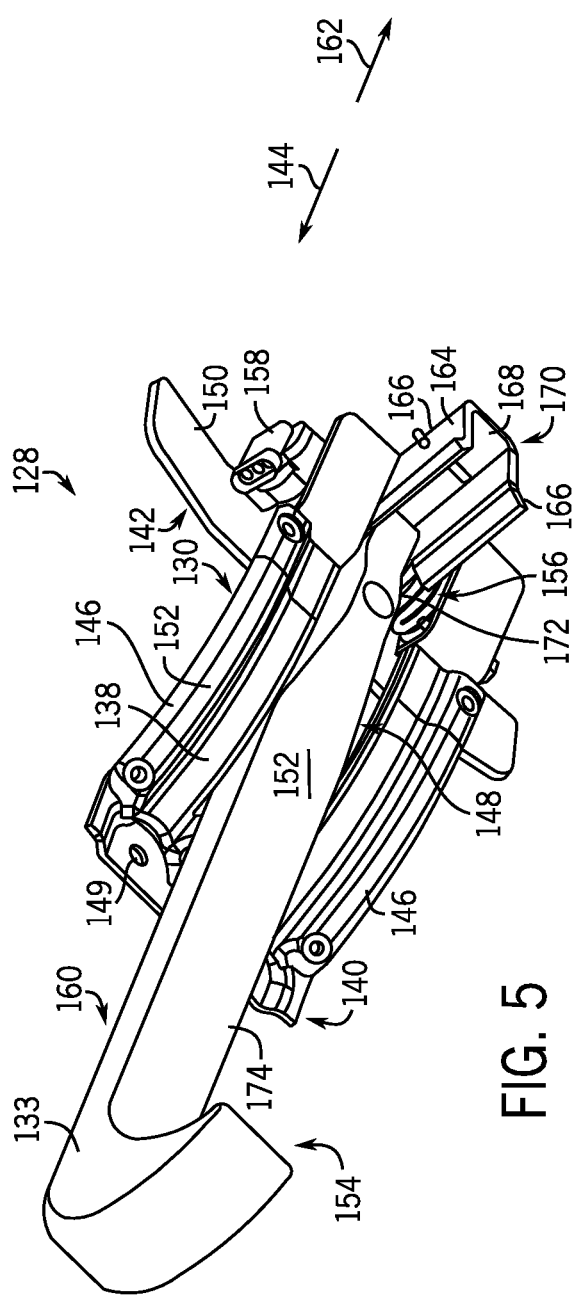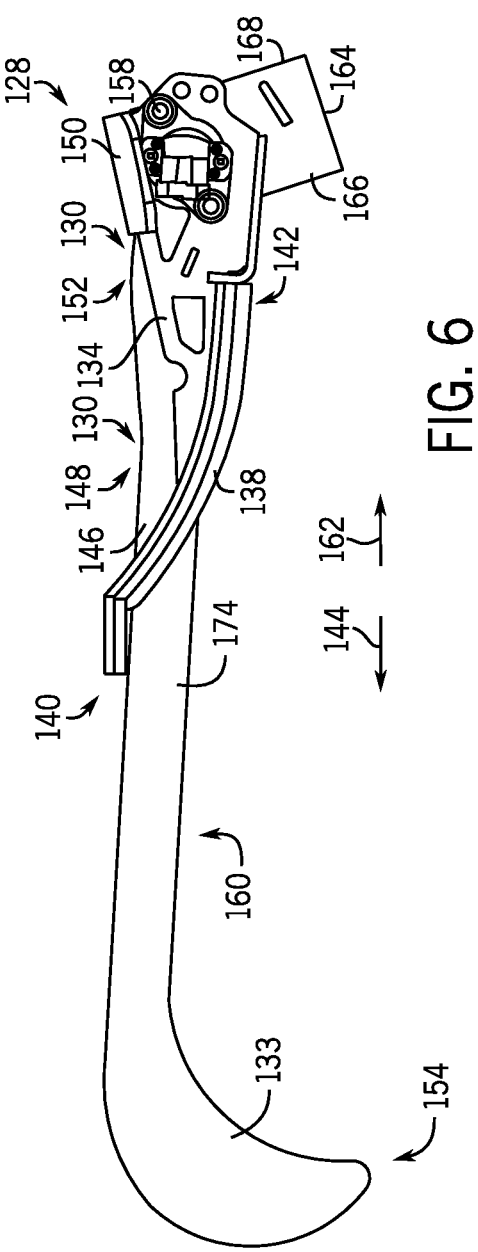

BREAKAWAY RIGID HEADER HEIGHT CONTROL SYSTEM

BACKGROUND

The present disclosure relates generally to an agricultural header and, more particularly, to a breakaway rigid header height control system for the agricultural header.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

During a harvesting operation, a header at the front of a harvester cuts ripened crops from the field. The header is attached to the front of the harvester and includes mechanisms, for example, for cutting crops, gathering crops and depositing crops into a feederhouse. The objective of the agricultural harvester is to gather as much crop material as possible when traveling across the field. This can become increasingly difficult as the ground contour can vary. As a result, header height control systems are utilized to raise, lower and tilt the header in order to maximize the harvester's crop yield.

Generally, a rigid header height control system utilizes a control sensor assembly to accurately detect the contour of the ground for changes in landscape i.e., its position relative to the ground as it travels over uneven terrain. In one example, an upper end of a rigid arm (e.g., ground feeler) is coupled to a sensor to detect rotation of the rigid arm and a lower end of rigid arm drags along the ground. The lower end of the rigid arm is pushed upward by the ground as the header travels forward while the sensor detects rotation of the rigid arm. This rigid arm may be attached to a header frame by a cable. However, when the harvester reverses direction, the rigid arm may dig into the ground and try to bend in the opposite direction. This bending in the opposite direction will drive a bending load into a cutter bar and potentially damage the cutter bar.

BRIEF DESCRIPTION

This brief description is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a rigid height control system configured to be coupled to a header of an agricultural harvester is provided. The rigid height control system includes a rigid arm pivotally coupled to a shaft, wherein the rigid arm includes an upper end and a lower end, and wherein the lower end is configured to engage a ground surface. The rigid height control system also includes a metal channel guide coupled to the shaft. The rigid height control system further includes a magnet embedded within the rigid arm adjacent the upper end. The magnet is configured to keep a back surface of the upper end of the rigid arm attached to the metal channel guide via a magnetic force so that the lower end engages the ground surface when the agricultural harvester travels in a forward direction. The magnet is also configured, when the agricultural harvester travels in a reverse direction causing a force exerted by the ground surface on the rigid arm to exceed the magnetic force, to allow a release of the back surface of the rigid arm from the metal channel guide to enable the rigid arm to swing forward and upward.

In another embodiment, a header of an agricultural harvester is provided. The header includes a frame and a cutter bar coupled to the frame. The header also includes a rigid height control system configured to determine a height between the header and a ground surface when the header operates in a rigid condition. The rigid height control system includes a skid shoe coupling the rigid height control system to the cutter bar. The rigid height control system also includes a rigid arm pivotally coupled to a shaft, wherein the rigid arm includes an upper end and a lower end, and wherein the lower end is configured to engage a ground surface. The rigid height control system further includes a metal channel guide coupled to the shaft. The rigid height control system even further includes a magnet embedded within the rigid arm adjacent the upper end. The magnet is configured to keep a back surface of the upper end of the rigid arm attached to the metal channel guide via a magnetic force so that the lower end engages the ground surface when the agricultural harvester travels in a forward direction. The magnet is also configured, when the agricultural harvester travels in a reverse direction causing a force exerted by the ground surface on the rigid arm to exceed the magnetic force, to allow a release of the back surface of the rigid arm from the metal channel guide to enable the rigid arm to swing forward and upward.

In a further embodiment, an agricultural harvester is provided. The agricultural harvester includes a header. The agricultural harvester also includes a rigid height control system coupled to the header, wherein the rigid height control system is configured to determine a height between the header and a ground surface when the header operates in a rigid condition. The rigid height control system includes a rigid arm pivotally coupled to a shaft, wherein the rigid arm includes an upper end and a lower end, and wherein the lower end is configured to engage a ground surface. The rigid height control system also includes a metal channel guide coupled to the shaft. The rigid height control system further includes a magnet embedded within the rigid arm adjacent the upper end. When the agricultural harvester travels in a forward direction the rigid arm is configured to be in a working position where the lower end engages the ground surface due to magnetic force between the magnet and the metal channel guide. When the agricultural harvester travels in a reverse direction causing a force exerted by the ground surface on the rigid arm to exceed the magnetic force the rigid arm is configured to be in a breakaway position where the rigid arm is swung forward and upward.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 3 illustrates a cross-sectional side view of the breakaway rigid header height control system, taken along line 3-3 in FIG. 2, in accordance with aspects of the present disclosure;

FIG. 4 illustrates a cross-sectional side view of the breakaway rigid header height control system, taken within line 4-4 in FIG. 3, in accordance with aspects of the present disclosure;

FIG. 5 illustrates a perspective view of a portion of the breakaway rigid header height control system in FIG. 2 (e.g., in a breakaway position), in accordance with aspects of the present disclosure;

FIG. 6 illustrates a side view of a portion of the breakaway rigid header height control system in FIG. 2 (e.g., in a breakaway position), in accordance with aspects of the present disclosure.

DETAILED DESCRIPTION

Figure 1:
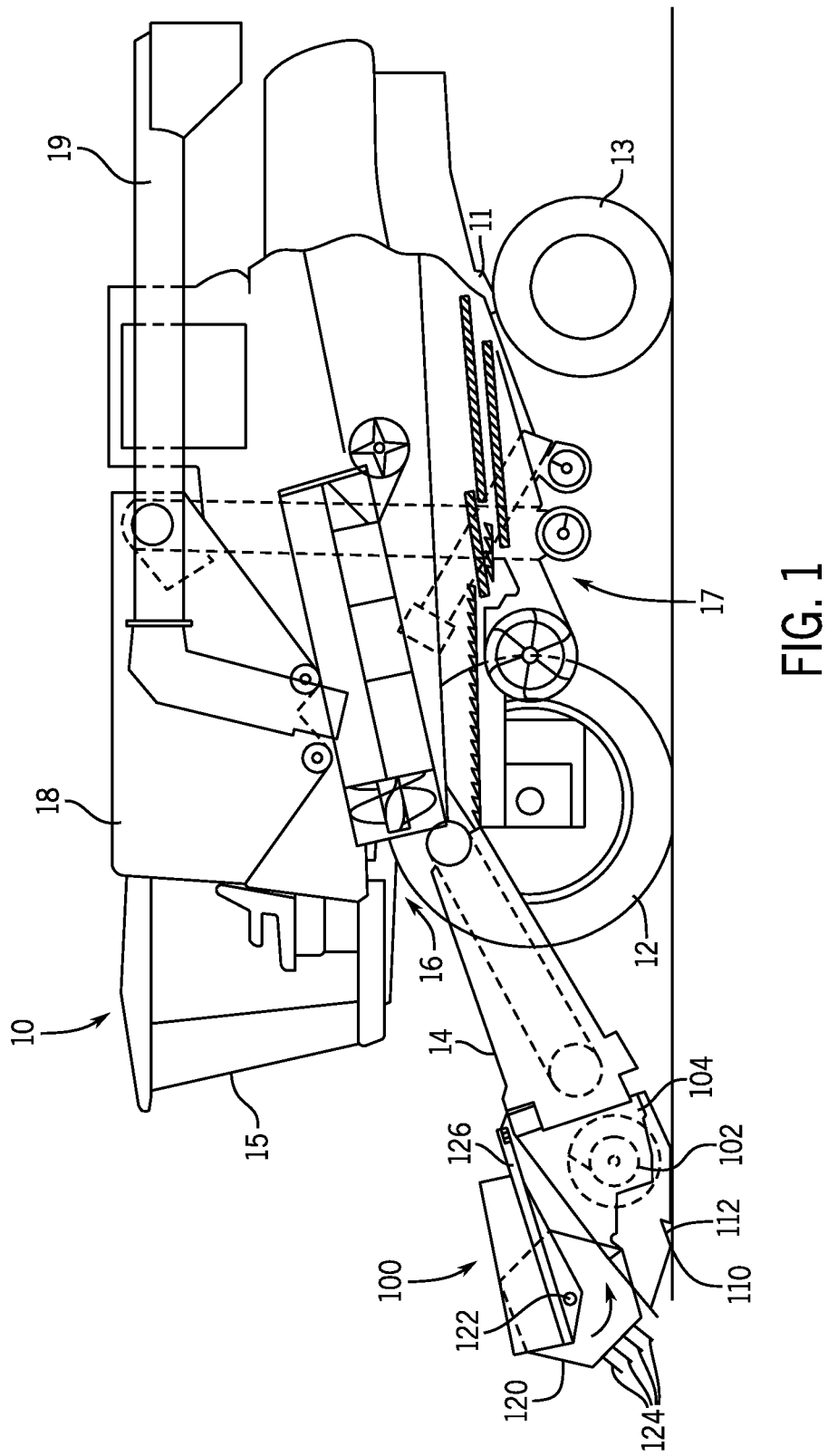
FIG. 1 illustrates an elevational view of an agricultural harvester in which a breakaway rigid header height control system can be used, in accordance with aspects of the disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate generally to a height control system (e.g., rigid height control system) configured to determine a height between a header of agricultural harvester and a ground surface when the header operates in a rigid condition. The height control system includes a rigid arm (e.g., ground feeler) pivotally coupled to a shaft, wherein the rigid arm includes an upper end and a lower end, wherein the lower end is configured to engage a ground surface. The upper end of the rigid arm includes a magnet. When the rigid arm is in a working condition (e.g., when the agricultural harvester travels in a forward direction), the magnet attaches the upper end (e.g., a back surface of the upper end) to a metal channel guide so that the upper end of rigid arm is disposed within a recess of the metal channel guide. When the agricultural harvester travels in a reverse direction causing a force exerted by the ground surface on the rigid arm to exceed the magnetic force between the magnet and the metal channel guide, the back surface of the rigid arm is released from the metal channel guide to enable the rigid arm to swing forward and upward into a breakaway position. The release (i.e., breakaway) of the rigid arm in response to the force exerted by the ground keeps the ride arm and the cutter bar (to which height control system is attached) from being damaged. When the agricultural harvester is no longer traveling in a reverse direction and the header is raised, the rigid arm naturally swings back into the working position. Thus, no additional springs are needed to return the rigid arm to its working position. The disclosed embodiments eliminate the need for a cable or stop to be attached to the header frame to keep the rigid arm from causing damage to the cutter bar when the agricultural harvester travels in the reverse direction.

FIG. 1 illustrates an elevational view of an agricultural harvester in which a breakaway rigid header height control system can be used. The agricultural harvester is shown in the form of a combine 10 on which breakaway rigid header height control system can be used. The combine 10 generally includes a chassis 11, ground engaging wheels 12 and 13, a header 100, a feeder housing 14, an operator cab 15, a threshing and separating system 16, a cleaning system 17, a grain tank 18, and an unloading auger 19. Although the agricultural harvester is shown in the form of a combine harvester, it is also to be understood that the harvester can take other forms. For example, the harvester also can be in the form of other types of self-propelled harvesters with headers, such as self-propelled windrowers, forage harvesters, sugarcane harvesters, cotton pickers, etc.

The header 100 is mounted to the front of the combine 10 and includes a cutter bar 110 (e.g., flexible cutter bar) for severing crops from a field during forward motion of combine 10. A rotatable reel 120 feeds the crop toward the cutter bar 110, and a double auger 102 feeds the severed crop laterally inwardly from each side toward feeder housing 14. Feeder housing 14 conveys the cut crop to threshing and separating system 16, and is selectively vertically movable using appropriate actuators, such as hydraulic cylinders (not shown). It should be understood that the general structures of header 100 also can take other forms. For example, instead of a double auger 102, one or more draper belts can be used.

The header 100 includes a header frame 104 which is carried by the chassis 11 and is coupled to both the cutter bar 110 and the reel 120. The cutter bar 110 is movably coupled to the header frame 104 by, for example, a pivotable cutter bar table 112, to enable the cutter bar 110 to move in an up/down direction.

The reel 120 rotates about an axis of rotation 122 and includes a plurality of tines 124 that will grab crop material and direct it toward the cutter bar 110 as the reel 120 rotates about reel axis of rotation 122. To adjust the relative positioning of the reel 120 relative to the header frame 104, the reel 120 is pivotably coupled to the header frame 104 by a reel arm 126 which carries the reel 120. In this sense, the reel arm 126 is pivotably coupled to the header frame 104 so forces acting on the reel arm 126 can cause the reel arm 126, and carried reel 120, to pivot.

It can be appreciated by those skilled in the art that the structures and systems of agricultural harvester 10 enable header 100 to be raised and lowered and/or tilted forward and back and/or tilted side to side to achieve the desired height and attitude for operating agricultural harvester 10 to harvest a crop. Header 100 also can be adjusted to a so-called flex mode header arrangement in which the cutter bar 110 follows the ground surface such that header 100 more or less floats over the field surface, or to a so-called rigid mode in which the header is more or less rigid across the width of the machine and at a fixed orientation relative to the ground surface. A breakaway rigid header height control system, as described in greater detail below, is provided as a ground sensing system while the header 100 is operated in a rigid mode.

Figure 2:
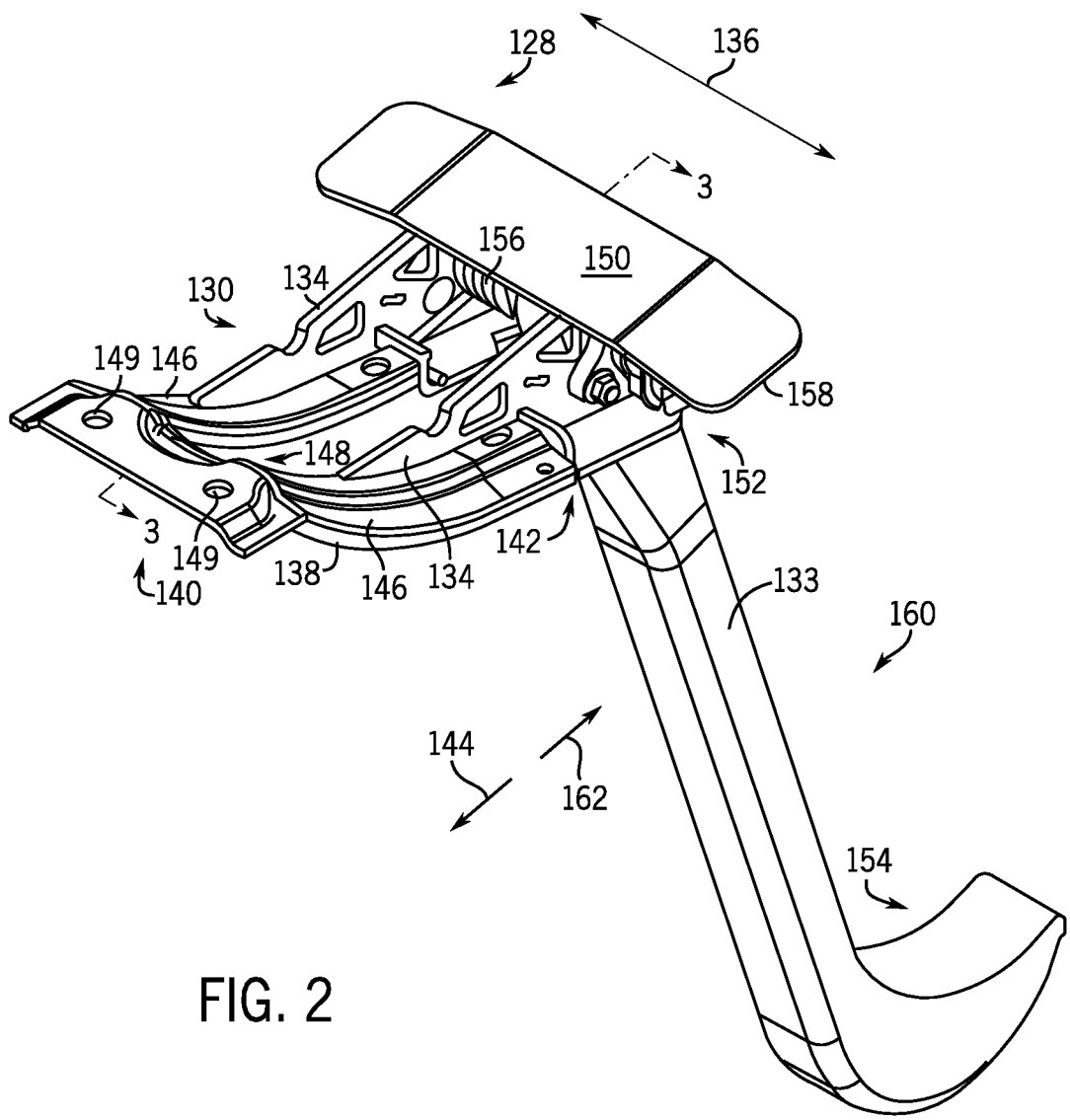
FIG. 2 illustrates a perspective view of a breakaway rigid header height control system, in accordance with aspects of the present disclosure.

FIG. 2 illustrates a perspective view of a header height control system 128 (e.g., breakaway rigid header height control system). FIGS. 3 and 4 illustrate cross-sectional side views of the header height control system 128. The header height control system 128 includes a frame assembly 130, a shaft 132 coupled to a frame assembly 130, and a rigid arm 133 (e.g., ground feeler) pivotally coupled to the shaft 132. The frame assembly 130 includes a pair of brackets 134 laterally spaced apart in a traverse direction 136. The frame assembly 130 also includes a skid shoe 138 coupled to the pair of brackets 134. The skid shoe 138 is configured to engage a ground surface and to provide a wear surface to protect the cutter bar (e.g., cutter bar 110 in FIG. 1). The skid shoe 138 includes a fore end 140 an aft end 142 (relative to a forward direction of travel 144 of the combine 10 in FIG. 1). The skid shoe 138 also includes a pair of lateral sides 146 extending between the fore end 140 and the aft end 142. The pair of lateral sides 146 define an opening or slot 148 between them. The fore end 140 of the skid shoe 138 is configured to couple the header height control system 128 to the cutter bar via fasteners disposed into openings 149 in the fore end 140. A belt ramp 150 is coupled to a top portion of the frame assembly 130. The belt ramp 150 keeps lugs of a belt or draper from getting caught within the header height control system 128.

The shaft 132 extends in the traverse direction 136 across the frame assembly 130 adjacent the aft end 142 of the skid shoe 138. The rigid arm 133 includes an upper end 152 and a lower end 154. As depicted in FIGS. 2-4, the rigid arm 133 is in a working position. In the working position (when the combine is traveling in the forward direction of travel 144), the lower end 154 of the rigid arm 133 engages the ground surface. The rigid arm 133 is biased into the working position via the biasing force of a spring 156 (down pressure spring) disposed about the shaft 132. The shaft 132 is spring loaded in the transverse direction 136 due to the spring 156. A sensor 158 (e.g., rotary sensor) is coupled to an end of the shaft 132 to detect a rotational position of both the shaft 132 and the rigid arm 133. The sensor 158 is configured to determine a height between the header and the ground surface based on the detected rotational position. The sensor 158 may be a rotary Hall effect sensor, potentiometer sensor, or other type of rotary sensor. As depicted, the upper end 152 and a central portion 160 of the rigid arm 133 are linear or straight and the lower end 154 is curved. The rigid arm 133 (when the rigid arm 133 is in the working position) extends in a direction 162 opposite the forward direction of travel 144 (where direction 162 is also a reverse direction of travel for the combine). The rigid arm 133 may be made of steel, rubber, or plastic.

The height control system 128 also includes a metal channel guide 164 coupled to the frame assembly 130. The metal channel guide 164 may be made of steel or another metal that is magnetic. The metal channel guide 164 includes a pair of sidewalls 166 flanking and extending from a rear wall 168 (e.g., having a U-shaped cross-section, see FIG. 5) that define a recess 170 within the metal channel guide 164.

As depicted in FIGS. 4 and 5, a magnet 172 (e.g., permanent magnet) is disposed (e.g. embedded) within the upper end 152 of the rigid arm 133. As depicted in FIGS. 4 and 5, the magnet 172 is embedded adjacent a back surface 174 of the rigid arm 133. In certain embodiments, the magnet 172 may be embedded in a more central location between a front surface and the back surface 174 of the upper end 152 of the rigid arm 133. The magnet 172 is configured, via magnetic force, to attach the back surface 174 of the upper end 152 of the rigid arm 133 to the metal channel guide 164 (e.g., the rear wall 168 of the metal channel guide 164) when the rigid arm 133 is in the working position.

Figure 7:
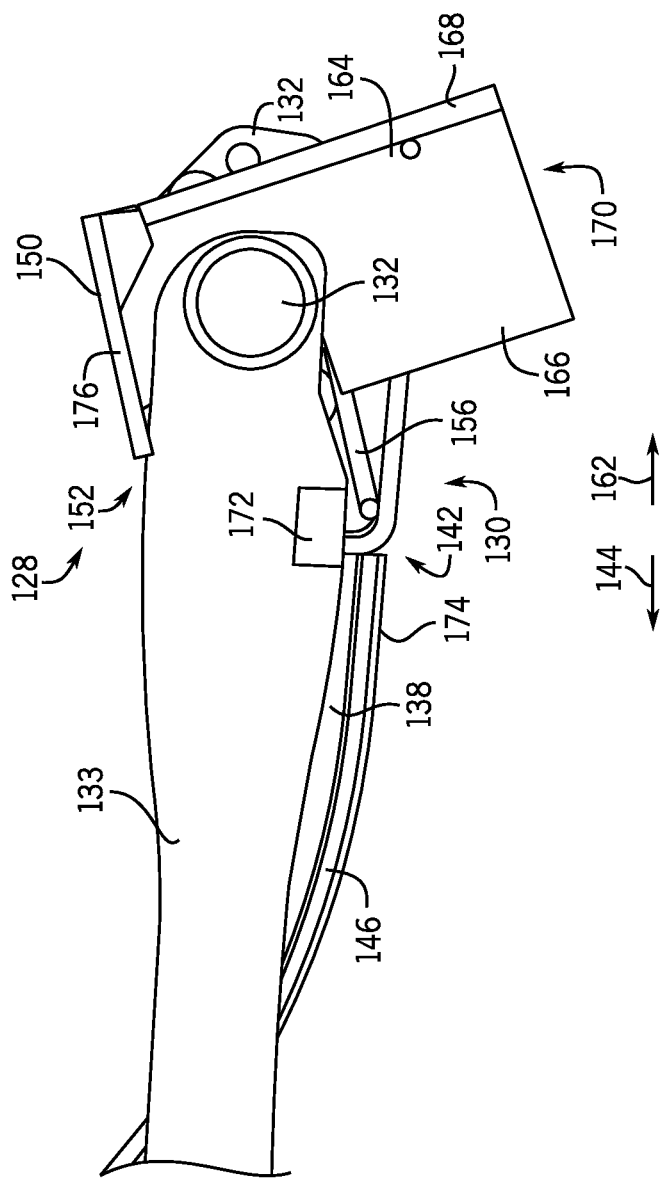
FIG. 7 illustrates a cross-sectional side view of a portion of the breakaway rigid header height control system in FIG. 2 (e.g., in a breakaway position), taken along line 3-3 in FIG. 2, in accordance with aspects of the present disclosure.

However, when the combine moves in the reverse direction 162, the lower end 154 of the rigid arm 133 digs into the ground surface which causes a force to be exerted on the lower end 154 of the rigid arm 133 that exceeds the magnetic force between the magnet 172 and the metal channel guide 164. When this occurs, the back surface 174 of the rigid arm 133 is released from the metal channel guide 164 to enable the rigid arm 133 to swing forward and upward into a breakaway position as depicted in FIGS. 5-7. In the breakaway position, the rigid arm 133 swings forward and upward so that a portion of the rigid arm 133 is disposed within the slot 148 of the skid shoe 138. Release of the rigid arm 133 into the breakaway position keeps both the rigid arm 133 and the cutter bar from being damaged. As depicted in FIGS. a top end 176 (e.g. extending between the side walls 166 of the metal channel guide 164 is configured to act as a mechanical stop to limit the swinging of the rigid arm 133 forward and upward upon release of the back surface 174 of the rigid arm 133 from the metal channel guide 164.

Once the combine has ceased movement in the reverse direction 162, the header can be raised and the rigid arm 133 will naturally swing down and rearward back into the working position with the magnet 172 pulling and attaching the rigid arm 133 to the metal channel guide 164 once again. No additional springs are needed to return the rigid arm 133 to the working position.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A rigid height control system configured to be coupled to a header of an agricultural harvester, comprising:
   a rigid arm pivotally coupled to a shaft, wherein the rigid arm comprises an upper end and a lower end, and wherein the lower end is configured to engage a ground surface;
   a metal channel guide coupled to the shaft; and
   a magnet embedded within the rigid arm adjacent the upper end, wherein the magnet is configured to keep a back surface of the upper end of the rigid arm attached to the metal channel guide via a magnetic force so that the lower end engages the ground surface when the agricultural harvester travels in a forward direction, and the magnet is configured, when the agricultural harvester travels in a reverse direction causing a force exerted by the ground surface on the rigid arm to exceed the magnetic force, to allow a release of the back surface of the rigid arm from the metal channel guide to enable the rigid arm to swing forward and upward.

2. The rigid height control system of claim 1, further comprising a skid shoe, wherein the skid shoe is configured to couple the rigid height control system to a cutter bar of the header.

3. The rigid height control system of claim 2, wherein the rigid arm, when released from the metal channel guide, swings into a slot of the skid shoe.

4. The rigid height control system of claim 1, wherein the metal channel guide has two sidewalls flanking a rear wall to define a recess, and the magnet is configured to keep the upper end of the rigid arm disposed within the recess of the metal channel guide via the magnetic force so that the lower end engages the ground surface when the agricultural harvester travels in the forward direction.

5. The rigid height control system of claim 1, wherein the shaft is coupled to a sensor configured to detect a rotational position of the shaft to determine a height between the header and the ground surface.

6. The rigid height control system of claim 1, wherein, after the release of the back surface of the rigid arm from the metal channel guide and swinging of the rigid arm forward and upward, upon lifting the header the rigid arm is configured to swing back until the back surface of the upper end of the rigid arm reattaches to the metal channel guide via the magnet.

7. The rigid height control system of claim 1, wherein a top end of the metal channel guide is configured to act as a mechanical stop to limit the swinging of the rigid arm forward and upward upon release of the back surface of the rigid arm from the metal channel guide.

8. The rigid height control system of claim 1, comprising a spring to bias a rotation of the rigid arm toward the metal channel guide.

9. A header of an agricultural harvester, comprising:
a frame;
a cutter bar coupled to the frame; and
a rigid height control system configured to determine a height between the header and a ground surface when the header operates in a rigid condition, wherein the rigid height control system comprises:
  a skid shoe coupling the rigid height control system to the cutter bar;
  a rigid arm pivotally coupled to a shaft, wherein the rigid arm comprises an upper end and a lower end, and wherein the lower end is configured to engage the ground surface;
  a metal channel guide coupled to the shaft; and
  a magnet embedded within the rigid arm adjacent the upper end, wherein the magnet is configured to keep a back surface of the upper end of the rigid arm attached to the metal channel guide via a magnetic force so that the lower end engages the ground surface when the agricultural harvester travels in a forward direction, and the magnet is configured, when the agricultural harvester travels in a reverse direction causing a force exerted by the ground surface on the rigid arm to exceed the magnetic force, to allow a release of the back surface of the rigid arm from the metal channel guide to enable the rigid arm to swing forward and upward.

10. The header of claim 9, wherein the rigid arm, when released from the metal channel guide, swings into a slot of the skid shoe.

11. The header of claim 9, wherein the metal channel guide has two sidewalls flanking a rear wall to define a recess, and the magnet is configured to keep the upper end of the rigid arm disposed within the recess of the metal channel guide via the magnetic force so that the lower end engages the ground surface when the agricultural harvester travels in the forward direction.

12. The header of claim 9, wherein the shaft is coupled to a sensor configured to detect a rotational position of the shaft to determine the height between the header and the ground surface.

13. The header of claim 9, wherein, after the release of the back surface of the rigid arm from the metal channel guide and swinging of the rigid arm forward and upward, upon lifting the header the rigid arm is configured to swing back until the back surface of the upper end of the rigid arm reattaches to the metal channel guide via the magnet.

14. The header of claim 9, wherein a top end of the metal channel guide is configured to act as a mechanical stop to limit the swinging of the rigid arm forward and upward upon release of the back surface of the rigid arm from the metal channel guide.

15. The header of claim 9, comprising a spring to bias a rotation of the rigid arm toward the metal channel guide.

16. An agricultural harvester, comprising:
a header; and
a rigid height control system coupled to the header, wherein the rigid height control system is configured to determine a height between the header and a ground surface when the header operates in a rigid condition, and wherein the rigid height control system comprises:
  a rigid arm pivotally coupled to a shaft, wherein the rigid arm comprises an upper end and a lower end, and wherein the lower end is configured to engage the ground surface;
  a metal channel guide coupled to the shaft; and
  a magnet embedded within the rigid arm adjacent the upper end, wherein when the agricultural harvester travels in a forward direction the rigid arm is configured to be in a working position where the lower end engages the ground surface due to magnetic force between the magnet and the metal channel guide, and when the agricultural harvester travels in a reverse direction causing a force exerted by the ground surface on the rigid arm to exceed the magnetic force the rigid arm is configured to be in a breakaway position where the rigid arm is swung forward and upward.

17. The agricultural harvester of claim 16, wherein the rigid height control system comprises a skid shoe configured to couple the rigid height control system to the header, and wherein the rigid arm is disposed in a slot of the skid shoe when in the breakaway position.

18. The agricultural harvester of claim 16, wherein, when the rigid arm is in the breakaway position, upon lifting the header the rigid arm is configured to swing back into the working position.

19. The agricultural harvester of claim 16, wherein the metal channel guide has two sidewalls flanking a rear wall to define a recess, and the magnet is configured to keep the upper end of the rigid arm disposed within the recess of the metal channel guide via the magnetic force so that the lower end engages the ground surface when the rigid arm is in the working position.

20. The agricultural harvester of claim 16, wherein a top end of the metal channel guide is configured to act as a mechanical stop to limit the swinging of the rigid arm forward and upward upon moving into the breakaway position.

\* \* \* \* \*